(12) United States Patent
Pollitt et al.

(10) Patent No.: US 10,999,326 B1
(45) Date of Patent: May 4, 2021

(54) FINE GRAINED NETWORK SECURITY

(71) Applicant: Tigera, Inc., San Francisco, CA (US)

(72) Inventors: Alexander James Pollitt, San Francisco, CA (US); Amit Gupta, Fremont, CA (US)

(73) Assignee: Tigera, Inc., San Francisco, CA (US)

( * ) Notice: Subject to any disclaimer, the term of this patent is extended or adjusted under 35 U.S.C. 154(b) by 202 days.

(21) Appl. No.: 16/162,707

(22) Filed: Oct. 17, 2018

Related U.S. Application Data

(60) Provisional application No. 62/678,064, filed on May 30, 2018.

(51) Int. Cl.
*H04L 29/06* (2006.01)
*H04L 12/24* (2006.01)
*H04L 29/08* (2006.01)
*G06F 9/455* (2018.01)
*H04L 12/26* (2006.01)

(52) U.S. Cl.
CPC ......... *H04L 63/20* (2013.01); *G06F 9/45558* (2013.01); *H04L 41/0893* (2013.01); *H04L 43/026* (2013.01); *H04L 63/1425* (2013.01); *H04L 63/1441* (2013.01); *H04L 67/10* (2013.01); *G06F 2009/45587* (2013.01)

(58) Field of Classification Search
CPC ...................................................... H04L 63/20
See application file for complete search history.

(56) References Cited

U.S. PATENT DOCUMENTS

| | | | | |
|---|---|---|---|---|
| 2010/0275241 | A1* | 10/2010 | Srinivasan | G06F 9/5044 726/1 |
| 2014/0351573 | A1* | 11/2014 | Martini | H04L 63/0254 713/153 |
| 2015/0163158 | A1* | 6/2015 | Ryland | H04L 41/0893 709/225 |
| 2015/0188910 | A1* | 7/2015 | Tsai | H04L 63/205 713/175 |
| 2017/0034161 | A1* | 2/2017 | Isola | G06F 21/577 |

* cited by examiner

Primary Examiner — Simon P Kanaan
(74) Attorney, Agent, or Firm — Van Pelt, Yi & James LLP

(57) ABSTRACT

One or more security groups associated with a cloud provider are determined. One or more network polices associated with a container-orchestrator system are determined. One or more network security policies are generated based on the one or more determined security groups associated with the cloud provider and the one or more determined network policies associated with the container. The one or more network security policies are distributed to one or more VM instances of a cloud network. The one or more VM instances are configured to enforce network security based on the one or more network security policies.

19 Claims, 6 Drawing Sheets

FINE GRAINED NETWORK SECURITY

CROSS REFERENCE TO OTHER APPLICATIONS

This application claims priority to U.S. Provisional Patent Application No. 62/678,064 entitled FINE GRAINED NETWORK SECURITY FOR HETEROGENOUS RESOURCES ACROSS CLOUD, ON-PREM, BARE METAL, VMS AND CONTAINERS filed May 30, 2018 which is incorporated herein by reference for all purposes.

BACKGROUND OF THE INVENTION

Software applications/services are evolving on multiple axes: from on-prem to public cloud, from monoliths to distribute microservices, from bare metal to VMs to containers, from manually managed to automated to dynamically orchestrated. In this evolving ecosystem there are often multiple options and implementations for network security. For example, a public cloud provider might provide network security for VMs implemented within the cloud providers SDN using security groups as the primary controlling resource type, and an orchestrator container platform might provide network security for containers implemented within the orchestrator's container networking solution using container network policy as the primary controlling resource type.

In homogeneous application deployments, for example, consisting only of VMs in a single cloud provider, or only containers within a single container orchestrator, it is relatively easy for a user/operations engineer to manage and enforce appropriate fine grained network security. If the user/operations engineer is responsible for applications running separately across multiple environments then fine grained enforcement is still achievable but requires the user/operations engineer to understand multiple different security paradigms and APIs of the different environments. If an application is distributed across multiple environments or multiple applications (or microservices) that need to communicate are distributed across multiple environments, then managing network security becomes extremely challenging and in some cases requires significant security or operational compromises to be made.

BRIEF DESCRIPTION OF THE DRAWINGS

Various embodiments of the invention are disclosed in the following detailed description and the accompanying drawings.

DETAILED DESCRIPTION

Figure 1:
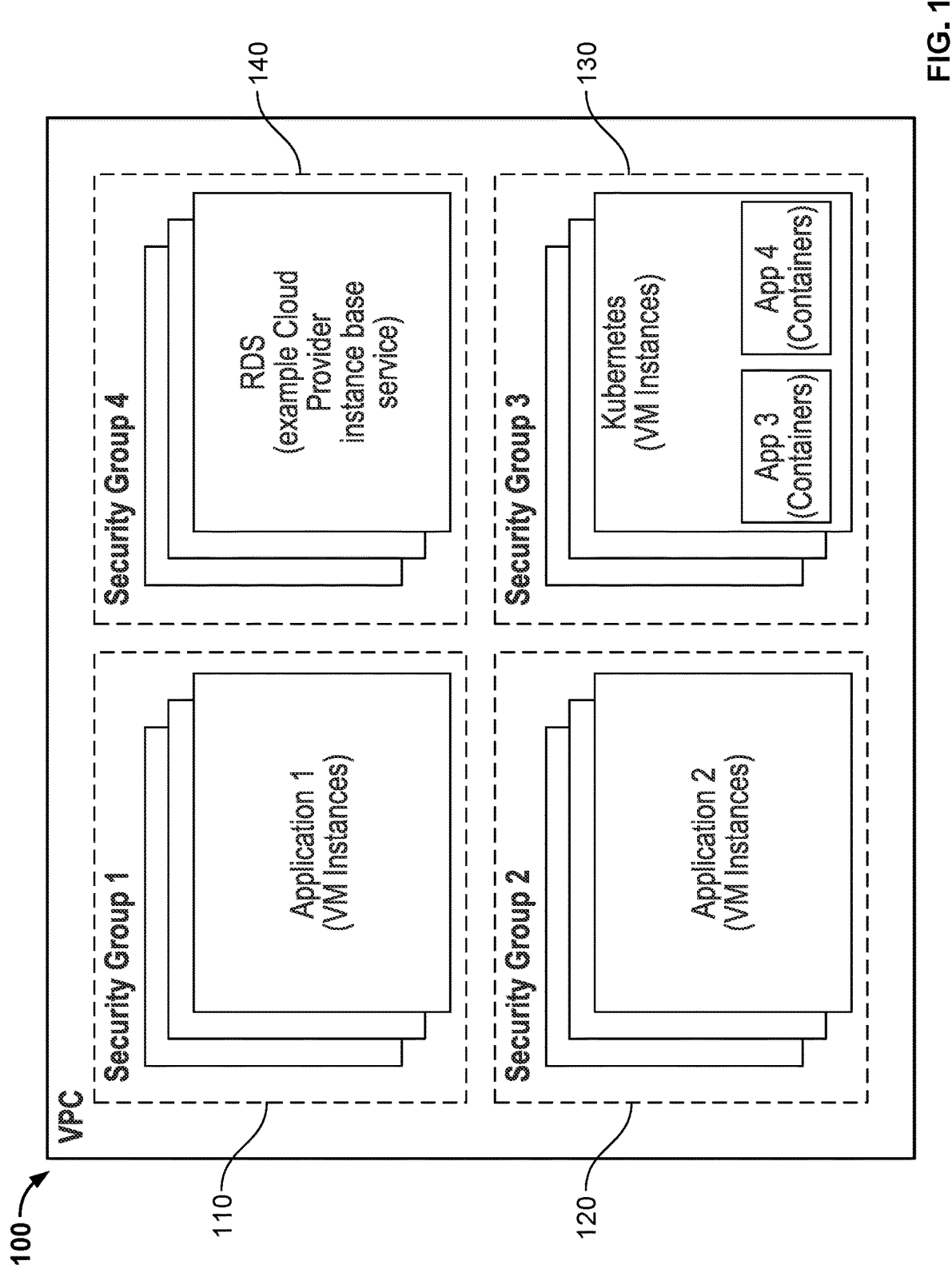
FIG. 1 is an example of security groups associated with a cloud provider in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A cloud provider (e.g., Amazon Web Services, Azure, etc.) may provision a virtual cluster of computers to an entity (e.g., enterprise, government, individual, organization, etc.). The virtual cluster is comprised of one or more virtual machine instances. The one or more virtual machine instances enable the entity to host one or more applications/services in a public/private cloud. The cloud provider may provide network security for the one or more virtual machine instances within the cloud provider's software defined network (SDN). The cloud provider may allow security groups to be defined. The security groups may be comprised of a plurality of virtual machine instances and specify which virtual machine instances are permitted to communicate to each other. A virtual machine instance may be part of one or more security groups.

The cloud provider is unaware of any application containers or pods running on a VM instance. The cloud provider is aware of VM instances running in the cloud network. The granularity of the public cloud security groups is limited because the SDN enforcement is configured to protect the public/private cloud at the virtual machine instance level. For example, a virtual machine instance may host a plurality of application pods. An application pod of the plurality of application pods may be comprised of one or more containers. A container may store sensitive data. If one of the one or more other virtual machine instances is permitted to communicate with the virtual machine instance, the one or more other virtual machine instances may be permitted to access data associated with the virtual machine instance, including the sensitive data stored by the container. Allowing or denying access at the virtual machine level is insufficient to protect the data associated with an entity because software applications/services are evolving on multiple axes: from on-prem to public cloud, from monoliths to distribute micro services, from bare metal to VMs to containers, from manually managed to automated and dynamically orchestrated. Thus, a need for finer-grained network security policies exists.

Fine-grained network security for heterogeneous environments is disclosed. A cloud provider is configured to provide network security based on security groups. The rules associated with a security group dictate the connectivity that is allowed. A rule associated with a security group may indicate that any of the virtual machine instances within the security group are permitted to communicate with each other. A rule associated with a security group may indicate that any virtual machine instance not part of the security group is not permitted to communicate with any of the virtual machine instances associated with the security group. The one or more rules associated with a security group may include exceptions. For example, a rule associated with a first security group may indicate that one or more virtual machine instances associated with a second security group are permitted to communicate with any of the virtual machine instances associated with the first security group. For example, a virtual machine instance of a first security group may be permitted to communicate with a virtual machine instance of a second security group, but not allowed to communicate with a virtual machine instance of a third security group.

A container-orchestration system is a system configured to automate, deploy, scale, and manage containerized applications in the form of application pods. An application pod may have metadata attached to it. The metadata may include one or more labels. An application pod may be deployed to a virtual machine instance. The virtual machine instance may be configured to host one or more application pods. A container-orchestrator system is configured to provide network security through the use of one or more network policies. A network policy may use pod metadata (e.g., cluster identity, namespace identity, pod identity, pod labels, etc.) to dictate the connectivity that is allowed. A rule of a network policy may indicate that application pods having a particular label are permitted to communicate with each other, but application pods not having the particular label are not allowed to communicate with any application pod having the particular label. For example, a first application pod having a first label may be permitted to communicate with a second application pod having the first label, but not allowed to communicate with a third application pod having a second label. A pod may be associated with zero or more network policies.

The fine grained network security is configured to combine the network security capabilities of a cloud provider with the network security capabilities of a container-orchestrator system. A fine grained network policy may expand security groups to include application pods by associating one or more application pods with a security group, that is, a security group may include one or more members comprising one or more VM instances and/or one or more application pods. An application pod may be a member of one or more security groups. For example, a first application pod hosted on a first VM instance may be part of a security group that includes one or more other VM instances. The mere fact that the first application pod hosted on the first VM instance is part of the security group does not necessarily mean that a second application pod hosted on the first VM instance is also part of the security group.

A fine grained network policy may expand network policies associated with a container-orchestrator system (e.g., Kubernetes) to include one or more VM instances by associating a label with a VM instance. For example, a VM instance may be assigned a label. A VM instance may be assigned one or more labels. A fine grained network policy may include a rule that allows application pods and VM instances with a "red" label are permitted to communicate with each other. The fine grained network policy may further include a rule that prevents application pods and/or VM instances with a "blue" label to communicate with application pods and/or VM instances with a "red" label. The fine grained network policy may include another rule that permits application pods and/or VM instances with a "green" label to communicate with application pods and/or VM instances with a "red" label.

A fine grained network policy may reference one or more security groups in a container-orchestrator system network policy rules using container-orchestrator system native label based idioms. A fine grained network policy may reference one or more VM instances in a container-orchestrator network policy using native label based idioms of container-orchestrator system. A fine grained network policy may reference one or more application pods in security group rules using cloud provider native security group ID/name based idioms. A fine grained network policy may enforce network access control based on the union of security groups and network policy rules. In some embodiments, the fine grained network policy may enforce network access control based on the union of security groups and network policy rules as an OR decision, e.g., either security group or network policy allows the traffic. In some embodiments, the fine grained network policy may enforce network access control based on the union of security groups and network policy rules as an AND decision, e.g., both security group and network policy rules allow the traffic).

A policy reconciliation engine, executing on a computing device, is configured to combine the network security capabilities of a cloud provider with the network security capabilities of a container-orchestrator system. The policy reconciliation engine may be configured to monitor a cloud provider management API to track security group configuration and virtual machine instance memberships. This allows the policy reconciliation engine to determine the one or more security groups, the one or more rules associated with each security group, and the members of each security group.

The policy reconciliation engine is further configured to monitor a container-orchestrator system API server to track network policy configuration, pod, and pod security group annotations. This allows the policy reconciliation engine to determine the one or more network policies, the one or more rules associated with each network policy, the one or more application pods to which each network policy applies, and a corresponding location for each of the one or more application pods.

The policy reconciliation engine is further configured to modify any security groups that may conflict with a network policy based on the one or more determined security groups and the one or more determined network policies. For example, a security group may indicate that a first virtual machine instance is not permitted to communicate with a second virtual machine instance. A network policy may indicate that a first workload pod hosted on the first virtual machine instance is permitted to communicate with a second workload pod hosted on the second virtual machine instance. The security group may be modified such that the first virtual machine instance is permitted to communicate with the second virtual machine instance. The policy reconciliation engine may modify the security group through a cloud provider management API. In response to the security group being modified through the cloud provider management API, a SDN enforcement of the cloud network is configured to enforce the modified security groups. The policy reconciliation engine may be configured to modify the security groups associated with a VM. One or more new security groups may be created. A VM may be added to at least one of the one or more new security groups.

The policy reconciliation engine is further configured to determine fine grained network security for the cloud network based on the one or more determined security groups and the one or more determined network policies. The policy reconciliation engine is configured to determine which application pods are permitted to communicate with each other and which application pods are not permitted to communicate with each other. The policy reconciliation engine is further configured to determine which VM instances host the application pods that are permitted to communicate with each other and which VM instances host the application pods that are not permitted to communicate with each other. The policy reconciliation engine is further configured resolve conflicts between the one or more determined security groups and the one or more determined network policies so that application pods that are permitted to communicate with each other are able to communicate with each other.

The policy reconciliation engine is configured to provide the fine grained network security to a host agent of each VM instance in the cloud network. In response to receiving the fine grained network security, the host agent is configured to program a host kernel of the VM instance on which the host agent is deployed to perform host enforcement by enforcing the fine grained network security.

Fine grained network security may be achieved by modifying one or more security groups enforced by the SDN enforcement of a cloud network and enabling VM instances to enforce fine grained network security rules. This allows operators to easily manage and enforce network security across heterogeneous environments using the most appropriate security resources across the deployment. For example, fine grained network security provides the ability to reference cloud provider security resources within orchestrator security resources (e.g., using normal orchestrator security idioms). Fine grained network security provides the ability to reference orchestrator security resources within cloud provider security resources (e.g., using normal cloud provider security idioms). Fine grained network security provides the ability to associate cloud provider workloads with orchestrator security resources. Fine grained network security provides the ability to associate orchestrator workloads with cloud provider security resources. Fine grained network security provides the ability to associate on-prem or bare metal workloads with orchestrator and cloud provider security resources.

FIG. 1 is an example of security groups associated with a cloud provider in accordance with some embodiments. In the example shown, virtual private cloud 100 includes a first security group 110, a second security group 120, a third security group 130, and a fourth security group 140. Although the example depicts virtual private cloud 100 having four security groups, virtual private cloud 100 may have n security groups, where n is a number greater than zero. Although the example depicts four distinct security groups, a VM instance may be part of one or more security groups.

The first security group 110 is comprised of one or more VM instances of Application 1. The second security group 120 is comprised of one or more VM instances of Application 2. The third security group 130 includes a VM cluster (e.g., Kubernetes) that is comprised of one or more VM instances. Each VM instance of the VM cluster may include one or more containerized applications. In the example shown, a VM instance of the VM cluster includes App 3 and App 4. The fourth security group 140 is comprised of one or more instances of a relational database service (e.g., Amazon relational database service).

A cloud provider may use security groups to define network access control. The security groups may be defined by an entity associated with the cloud provider (e.g., enterprise, individual, government, organization, etc.). The entity may define the one or more VM instances that are part of a security group. The one or more VM instances that are part of a security group are permitted to communicate with each other. In general, a VM instance that is not part of the security group is not permitted to communicate with any of the one or more VM instances included in the security group. The entity may define one or more rules that enable one or more VM instances that are outside of the security group to communicate with any of the applications included in the security group.

For example, an entity associated with the third security group 130 may define a rule for the third security group 130. The entity associated with the third security group 130 may permit any of the VM instances associated with the first security group 110 to communicate with any of the VM instances of the VM Cluster in the third security group 130. Thus, any of the VM instances of Application 1 may have access to any of the data associated with App 3 and App 4. This may give rise to one or more security issues. An entity associated with the third security group may want a VM instance hosting Application 1 of the first security group 110 to have access to the data associated with App 3 of the third security group 130, but not have access to the data associated with App 4 of the third security group 130. Currently, cloud providers are configured to define security groups at the VM instance level. Thus, the entity associated with third security group must unwillingly give Application 1 of the first security group 110 access to the data associated with App 4 of the third security group 130.

Figure 2:
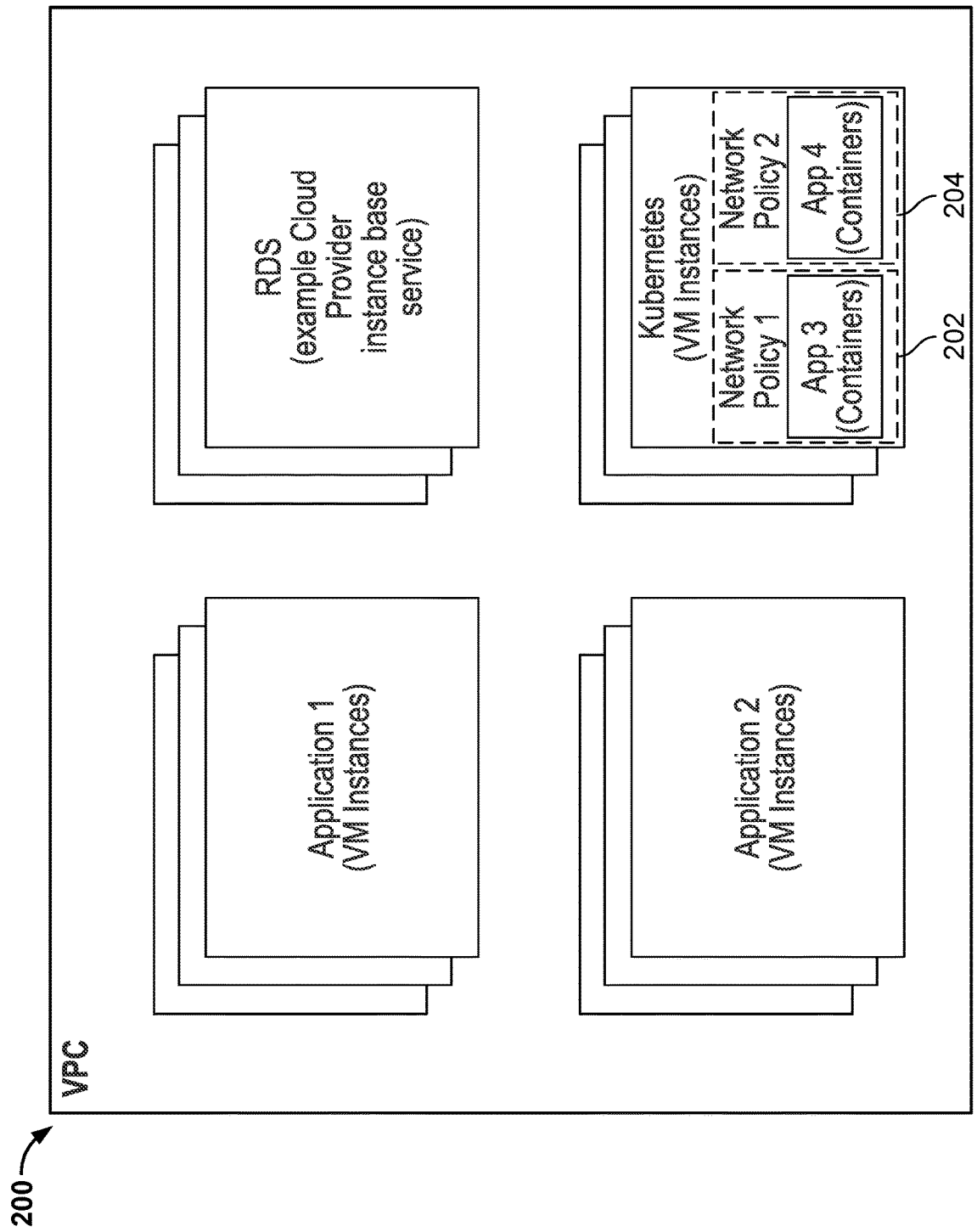
FIG. 2 is an example of network polices associated with a container-orchestrator system in accordance with some embodiments.

FIG. 2 is an example of network polices associated with a container-orchestrator system in accordance with some embodiments. Network policies are used in the container-orchestrator system to define network access control between two different applications hosted as containers (pods) on a VM instance of a VM cluster. Each pod has a set of one or more user defined labels (e.g., key-value pair) associated with it. A network policy associated with a container-orchestrator system is configured to use label expressions to identity the one or more pods to which the network policy applies. A pod included in the VM cluster may be associated with zero or more network policies. The rules included in a network policy dictate the connectivity allowed. A rule included in a network policy may include one or more references to one or more other groups of pods. The rule may specify the connectivity allowed using the label expressions. The rule may specify one or more labels that are permitted to access the one or more pods to which the network policy applies. The rule may specify one or more labels to which the one or more pods having a particular label are permitted to communicate.

In the example shown, network access control in virtual private cloud 200 is controlled by a first network policy 202 and a second network policy 204. The first network policy 202 may enable any of the App 3 instances in a VM cluster (e.g., Kubernetes) to communicate with each other. The second network policy 204 may enable any of the App 4 instances in the VM cluster to communicate with each other. A rule associated with the first network policy 202 may permit any of the pods that make up App 4 and having a label associated with App 4 to access App 3. In some embodiments, access permissions are not reciprocal. For example, the second network policy 204 is not necessarily required to permit containers of App 3 having a label associated with App 3 to have access to the one or more containers associated with App 4.

Such network policies are sufficient for a homogenous environment where communications between containers within a container-orchestrator system is of concern. However, if an application is distributed across multiple environments or multiple applications (e.g., microservices) that need to communicate are distributed across multiple environments, then solely relying on network policies of a container-orchestrator system is insufficient.

Figure 3:
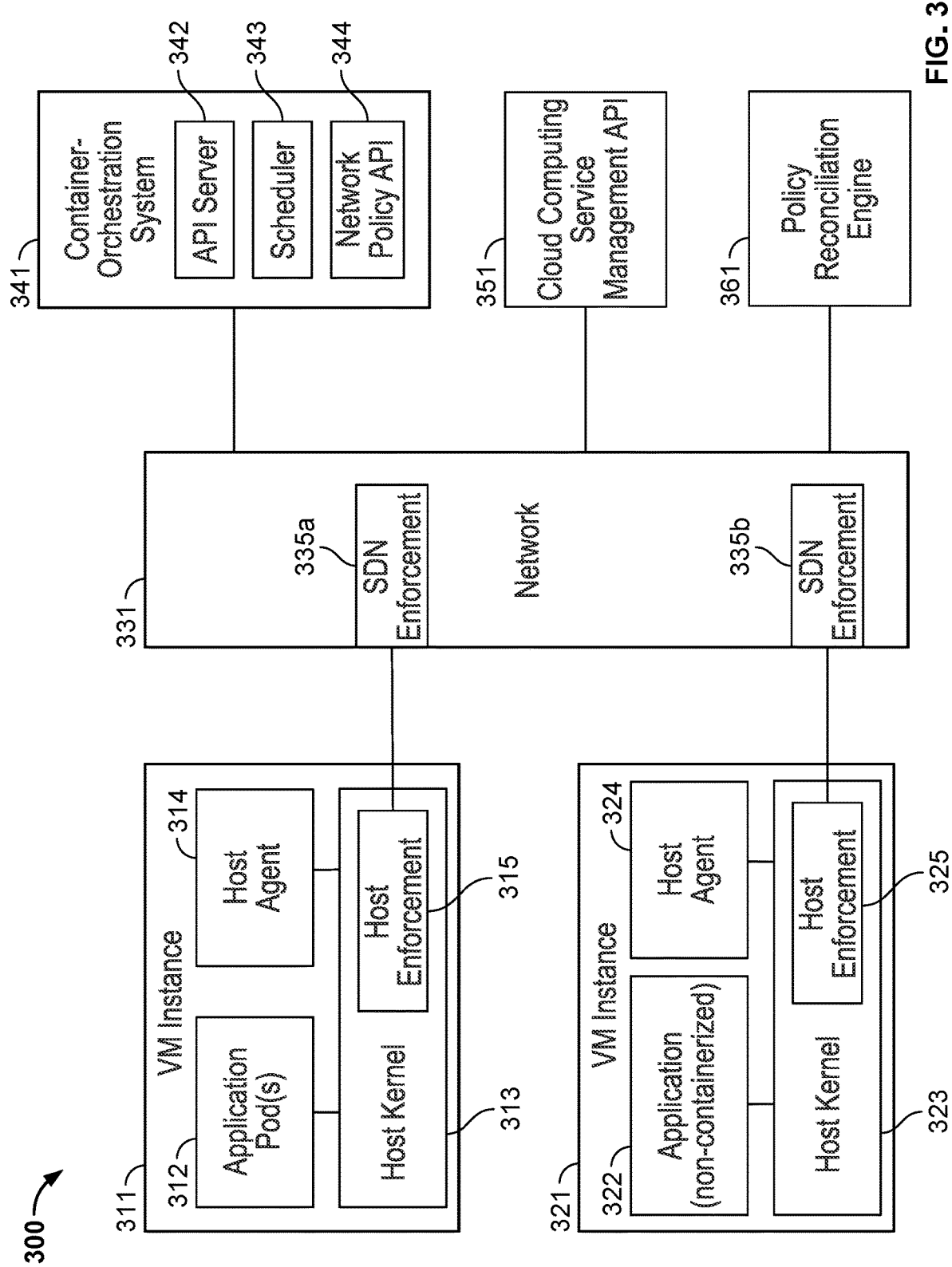
FIG. 3 is a block diagram illustrating an embodiment of a system for implementing fine grained network security.

FIG. 3 is a block diagram illustrating an embodiment of a system for implementing fine grained network security. In the example shown, system 300 includes VM Instance 311, VM Instance 321, Network 331, Container-Orchestrator System 341, Cloud Computing Service Management API 351, and Policy Reconciliation Engine 361.

Network 331 may be comprised of a public/private cloud. Network 331 may also include a local area network, a wide area network, a wireless network, a wired network, the Internet, an intranet, a telecommunications network, etc.

Container-Orchestration System 341 is a system configured to automate, deploy, scale, and manage containerized applications. Container-Orchestration System 341 is configured to orchestrate computing, networking, and storage infrastructure on behalf of user workloads. Container-Orchestration System 341 is configured to generate a plurality of application pods. An application pod is a deployable unit of computing. A service/application may be comprised of one or more application pods. Container-Orchestration System 341 may include Scheduler 343. Scheduler 343 may be configured to deploy the application pods to one or more VM instances. In some embodiments, the application pods are deployed to the same VM instance. In other embodiments, the application pods are deployed to a plurality of VM instances. Scheduler 343 may be configured to deploy the application pods to one or more VM instances based on one or more factors. For example, Scheduler 343 may deploy a plurality of application pods to a plurality of VM instances to spread the application pods across the plurality of VM instances. Scheduler 343 may avoid deploying an application pod to a VM instance with insufficient free resources. Scheduler 343 may co-locate a plurality of application pods on the same VM instance in the event the plurality of application pods frequently communicate with each other.

Scheduler 343 may deploy an application pod to a VM instance based on a label attached to the application pod. The label may be a key-value pair. Labels are intended to be used to specify identifying attributes of application pods that are meaningful and relevant to users, but do not directly imply semantics to the core system. Labels may be used to organize and to select subsets of application pods. Labels can be attached to an application pod at creation time and subsequently added and modified at any time. A user may configure a VM instance such that only application pods with a particular label may be deployed to a particular VM instance.

An application pod may have associated metadata. For example, an application pod may be associated with a cluster identity, a namespace identity, an application pod identity, and/or one or more application pod labels. The cluster identity identifies a cluster to which the application pod is associated. A cluster is comprised of a plurality of VM instances. System 300 may be comprised of one or more clusters. An application pod may be associated with at least one of the clusters. The namespace identity identifies a namespace to which the application pod is associated. System 300 may support multiple virtual clusters backed by the same physical cluster. These virtual clusters are called namespaces. Namespaces are a way to divide cluster resources between multiple users. For example, system 300 may include namespaces such as "default," "kube-system" (a namespace for objects created by a container-orchestration system, such as Kubernetes), and "kube-public" (a namespace created automatically and is readable by all users). The application pod identity identifies the application pod. An application pod is assigned a unique ID.

The metadata associated with an application pod may be stored by API Server 342. API Server 342 is configured to store the names and locations of each application pod in system 300. For example, API Server 342 is configured to store information indicating the specific VM instance to which an application pod is deployed. API Server 342 may be configured to communicate using JSON. API Server 342 is configured to process and validate REST requests and update state of the API objects in a datastore (for example, etcd), thereby allowing users to configure applications and containers across VM instances.

An application pod may include one or more containers. A container may be configured to implement a virtual instance of a single application or microservice. The one or more containers of the application pod are configured to share the same resources and local network of the VM instance on which the application pod is deployed. A container of an application pod may easily communicate with another container of the application pod as though they were on the same machine while maintaining a degree of isolation from others.

When deployed to a VM instance, an application pod has an associated IP address. The associated IP address is shared by the one or more containers of an application pod. The lifetime of an application pod may be ephemeral in nature. As a result, the IP address assigned to the application pod may be reassigned to a different application pod that is deployed to the VM instance. In other embodiments, an application pod is migrated to a different VM instance of the cluster. The application pod may be assigned a different IP address on the different VM instance. Membership of a security group may be based on IP address. The security group membership may need to be modified each time an application pod is migrated to different VM instances. The metadata associated with an application pod is attached to the application pod and follows the application pod from VM instance to VM instance. The network policies associated with the application pod follow the application pod regardless of which VM instance hosts the application pod. The fine grained network security policies may seamlessly continue to provide network security for the application pod as the application pod moves from VM instance to VM instance without having to update security groups. This provides network administrators with flexibility in enforcing the rules associated with Network 331.

Network Policy API 343 (e.g., Calico) may be configured to enable an entity associated with one or more application pods to define a network policy associated with one or more application pods. The network policy may be based on one or more security rules. The security rules may be based on metadata associated with an application pod. For example, a network policy may permit application pods with a particular cluster identity to communicate with each other and prevent application pods that do not have the particular cluster identity from communicating with application pods that have the particular cluster identity. A network policy may permit application pods with a particular cluster identity to communicate with each other and specify exceptions (e.g., specific IP addresses, pods associated with other namespace, specific endpoints, pods having a particular label, etc.) that are permitted are permitted to communicate with application pods having the particular cluster identity. A network policy may permit application pods with a particular name space to communicate with each other and prevent application pods that do not have the particular name space from communicating with application pods that have the particular name space. A network policy may permit application pods with a particular namespace to communicate with each other and specify exceptions (e.g., specific IP addresses, pods associated with other namespace, specific endpoints, pods having a particular label, etc.) that are permitted are permitted to communicate with application pods having the particular namespace. A network policy may permit application pods with a particular label to communicate with each other and prevent a pod that does not have the particular label from communicating with application pods having the particular label. A network policy may permit application pods with a particular label to communicate with each other and specify application pods having a different label that are permitted to communicate with application pods having the particular label. The one or more network policies may be stored by API Server 342.

Cloud Computing Service Management API 351 may enable an entity associated with a VM instance to specify one or more security groups associated with the VM instance. Cloud Computing Service Management API 351 may enable an entity to define one or more security groups. A security group is used to define network access control between VM instances. An entity may identify the one or more VM instances that are part of a security group. A VM instance may be part of zero or more security groups. The rules associated with a security group dictate the connectivity allowed. The VM instances associated with a security group are permitted to communicate with each other. A rule of the security group may permit the VM instances of the security group to communicate with VM instances of a different security group. When a VM instance is generated, an entity associated with the VM instance may use Cloud Computing Service Management API 351 to define one or more security groups with which the generated VM instance is associated.

Policy Reconciliation Engine 361 may be running on a computing device, such as a computer, server, laptop, mobile electronic device, etc. Policy Reconciliation Engine 361 may be configured to monitor Cloud Computing Service Management API 351 to track security group configuration and virtual machine instance memberships. This allows Policy Reconciliation Engine 361 to determine the one or more security groups associated with System 300. Policy Reconciliation Engine 361 may be configured to identify the one or more rules associated with a security group. Policy Reconciliation Engine 361 may be configured to identify the one or more VM instances that are part of a security group. Policy Reconciliation Engine 361 may be configured to determine one or more other VM instances of the security group with which a VM instance of the security group is permitted to communicate. Policy Reconciliation Engine 361 may be configured to determine one or more other security groups with which a security group is permitted to communicate. Policy Reconciliation Engine 361 may be configured to determine VM instances of one or more other security groups with which a VM instance of a security group is permitted to communicate.

Policy Reconciliation Engine 361 may be configured to subscribe to security group updates from Cloud Computing Service Management API 351. For example, a VM instance may be removed from/added to a security group. Policy Reconciliation Engine 361 may be configured to subscribe to such an update and modify one or more fine grain network security policies based on the update. In the event a VM instance is removed from a security group, Policy Reconciliation Engine 361 is configured to modify one or more fine grain network security policies such that the removed VM instance no longer has the permissions associated with the one or more fine grain network security policies. In the event a VM instance is added to a security group, Policy Reconciliation Engine 361 is configured to modify one or more fine grain network security policies such that the added VM instance has the permissions associated with the one or more fine grain network security policies.

Policy Reconciliation Engine 361 may be configured to monitor API Server 342 of Container-Orchestrator System 341 to determine one or more network policies associated with System 300. A network policy may apply to one or more application pods. Policy Reconciliation Engine 361 may be configured to determine the one or more application pods to which a network policy applies. A network policy may include one or more rules. Policy Reconciliation Engine 361 may be configured to determine which one or more application pods to which a rule applies. Policy Reconciliation Engine 361 may be configured to determine a corresponding location for each of the one or more application pods, i.e., the VM instance to which an application pod is deployed.

Policy Reconciliation Engine 361 may be configured to subscribe to network policy updates from API Server 342. For example, the metadata associated with an application may be modified such that a network policy no longer applies/applies to the application pod. For example, a label associated with a network policy may be removed from an application pod, i.e., the network policy associated with the label does not apply to the application pod. A label associated with a network policy may be added to an application pod, i.e., the network policy associated with the label applies to the application pod.

Policy Reconciliation Engine 361 may be configured to subscribe to such an update and modify one or more fine grain network security policies based on the update. In the event the metadata associated with an application pod is modified such that a network policy no longer applies to the application pod, Policy Reconciliation Engine 361 is configured to modify one or more fine grain network security policies such that the removed application pod no longer has the permissions associated with the one or more fine grain network security policies. In the event the metadata associated with an application pod is modified such that a network policy applies to the application pod, Policy Reconciliation Engine 361 is configured to modify one or more fine grain network security policies such that the added application pod has the permissions associated with the one or more fine grain network security policies.

Policy Reconciliation Engine 361 is configured to generate one or more fine grained network security policies based on the one or more security groups established by Cloud Computing Service Management API 351 and the one or more network policies established by Network Policy API 344. A fine grained network policy may expand security groups to include application pods by associating one or more application pods with a security group, that is, a security group may include one or more members comprising one or more VM instances and/or one or more application pods. An application pod may be a member of one or more security groups. For example, a first application pod hosted on a first VM instance may be part of a security group that includes one or more other VM instances. The mere fact that the first application pod hosted on the first VM instance is part of the security group does not necessarily mean that a second application pod hosted on the first VM instance is also part of the security group.

A fine grained network policy may expand network policies associated with a container-orchestrator system (e.g., Kubernetes) to include one or more VM instances by associating a label with a VM instance. For example, a VM instance may be assigned a label. A VM instance may be assigned one or more labels. A fine grained network policy may include a rule that allows application pods and VM instances with a "red" label are permitted to communicate with each other. The fine grained network policy may further include a rule that prevents application pods and/or VM instances with a "blue" label to communicate with application pods and/or VM instances with a "red" label. The fine grained network policy may include another rule that permits application pods and/or VM instances with a "green" label to communicate with application pods and/or VM instances with a "red" label.

A fine grained network policy may enable a network policy to reference one or more security groups using native label based idioms of Container-Orchestrator System 341. A fine grained network policy may enable a network policy to reference one or more VM instances using native label based idioms of Container-Orchestrator System 341. A fine grained network policy may enable a security group to reference one or more application pods using cloud provider native security group ID/name based idioms. A fine grained network policy may enforce network access control based on the union of security groups and network policy rules. In some embodiments, the fine grained network policy may enforce network access control based on the union of security groups and network policy rules as an OR decision, e.g., either security group or network policy allows the traffic. In some embodiments, the fine grained network policy may enforce network access control based on the union of security groups and network policy rules as an AND decision, e.g., both security group and network policy rules allow the traffic).

Policy Reconciliation Engine 361 is configured to apply any required security group changes using Cloud Computing Service Management API 351. For example, a first pod may be located on a first VM instance that is part of a security group. The first pod may have a label that permits the first pod to communicate with a second pod located on a second VM instance. The second VM instance may not be part of the security group. Policy Reconciliation Engine 361 may use Cloud Computing Service Management API 351 to modify the security group such that the second VM instance is part of the security group. A second pod may be added to a security group. The security group may be modified such that the VM instance on which the second pod is deployed is a member of the security group.

The rules associated with the one or more security groups of System 300 may be enforced by the SDN enforcement of Network 331. The SDN Enforcement of Network 331 is configured to permit/deny traffic at the VM instance level. The SDN Enforcement of Network 331 is unaware of application pods that are deployed throughout System 300 and their corresponding location. The SDN Enforcement of Network 331 is configured to permit or deny traffic from one VM instance to another VM instance. For example, SDN Enforcement 335*a* may permit or deny traffic from VM Instance 311. SDN Enforcement of Network 331 may permit or deny traffic from a VM instance based on one or more rules associated with the one or more security groups. For example, SDN Enforcement 335*a* is configured to enforce the rules associated with the one or more security groups with respect to VM Instance 311. SDN Enforcement 335*a* may permit or deny traffic from VM Instance 311 to VM Instance 321 depending upon whether VM Instance 311 and VM Instance 321 are part of the same security group. SDN Enforcement 335*b* is configured to enforce the rules associated with the one or more security groups with respect to VM Instance 321. System 300 may include one or more VM Instances (not shown) and Network 331 may include corresponding SDN Enforcement for each additional VM Instance. The SDN Enforcement of Network 331 is configured to enforce security groups at the VM instance level and is not configured to enforce network security at the pod level. The SDN Enforcement of Network 331 may be configured to allow traffic that has been allowed by Host Enforcement 315, 325. In some embodiments, the SDN Enforcement of Network 331 may be configured to allow traffic that has been allowed by Host Enforcement 315, 325, even if SDN Enforcement of Network 331 is not configured to permit the traffic.

Policy Reconciliation Engine 361 is configured to determine fine grained network security for the cloud network based on the one or more determined security groups and the one or more determined network policies. Policy Reconciliation Engine 361 is configured to determine which application pods are permitted to communicate with each other and which application pods are not permitted to communicate with each other. Policy Reconciliation Engine 361 is further configured to determine which VM instances host the application pods that are permitted to communicate with each other and which VM instances host the application pods that are not permitted to communicate with each other. Policy Reconciliation Engine 361 is further configured resolve conflicts between the one or more determined security groups and the one or more determined network policies so that application pods that are permitted to communicate with each other are able to communicate with each other.

Policy Reconciliation Engine 361 is configured to distribute the one or more fine grained network security policies to Host Agents 314, 324 of VM Instances 311, 321, respectively. In some embodiments, VM Instances 311, 321 are instances of virtual machines running on a computing device, such as a computer, server, laptop, mobile electronic device, etc. In some embodiments, VM Instances 311, 321 are running on the same computing device. In other embodiments, VM Instances 311, 321 are running on different computing devices. VM Instances 311, 321 run an associated operating system (e.g., Windows, MacOS, Linux, etc.) and include an associated Kernel 313, 323 (e.g., Windows kernel, MacOS kernel, Linux kernel, etc.). VM Instance 311 may have a set of one or more application pods 312. The one or more application pods 312 may be combined to form an application. VM Instance 321 may include a non-containerized application 322. Although system 300 depicts two VM instances, system 300 may include n VM instances where n is an integer greater than one. System 300 may include one or more VM instances that host one or more application pods. System 300 may include one or more VM instances that host a non-containerized application. System 300 may include one or more VM instances that host one or more application pods and one or more VM instances that host a non-containerized application.

VM Instance 311 is configured to receive a set of one or more application pods 312 from Scheduler 343. Each application pod of the set of one or more application pods 312 has an associated IP address. An application pod of the set of one or more application pods 312 may be configured to communicate with another application pod of the set of one or more application pods 312. An application pod of the set of one or more application pods 312 may be configured to communicate with another application pod located in the system 300. An application pod of the set of one or more application pods 312 may be configured to an endpoint external to system 300. When an application pod is terminated, the IP address assigned to the terminated application pod may be reused and assigned to a different application pod. An application pod may be destroyed. Each time an application pod is resurrected, it is assigned a new IP address. An application pod may be migrated to a different VM instance. The migrated application pod is assigned to a different IP address and the IP address assigned to the application pod may be reused and assigned to a different application pod. In some embodiments, a new application pod is deployed to a VM instance, for example, VM Instance 311. The new application pod may be prevented from communicating with other application pods until a host agent of the VM instance on which the new application pod is deployed receives metadata associated with the new application pod from API Server 342. The new application pod may have associated metadata that indicates one or more application pods with which the new workload pod is allowed to communicate. For example, a new application pod may have a "red" label and a network policy associated with system 300 may indicate that application pods having a "red" label are only allowed to communicate with other application pods having a "red" label. Thus, the new application pod may not be allowed to communicate with an application pod having a "blue" label.

VM Instance 311 includes Host Kernel 313. Host Kernel 313 is configured to control access to the CPU associated with VM Instance 311, memory associated with VM Instance 311, input/output requests associated with VM Instance 311, and networking associated with VM Instance 311. Host Agent 314 is configured to program a data plane of Host Kernel 313 to include Host Enforcement 315. Host Enforcement 315 is based on the one or more fine grained network security policies received from Policy Reconciliation Engine 361. Host Enforcement 315 may be configured to enforce network security at the pod level.

Host Enforcement 315 is coupled to SDN Enforcement 335a. Host Enforcement 315 and SDN Enforcement 335a work together to ensure that permitted traffic is allowed to be transmitted to a permitted endpoint (e.g., pod, VM instance, endpoint outside of System 300) and to ensure that non-permitted traffic is dropped. In some embodiments, in the event Host Enforcement 315 permits traffic from one of the application pods 312 to an endpoint, then SDN Enforcement 335a is also configured to permit the traffic. In some embodiments, in the event Host Enforcement 315 denies traffic from one of the application pods 312, then Host Enforcement 315 is configured to drop the traffic and SDN Enforcement 335a does not receive the traffic.

In some embodiments, traffic between one of the application pods 312 hosted on VM Instance 311 and another application hosted on another VM instance (not shown) is allowed, but the traffic between the two different VM instances is not allowed. In the event Host Enforcement 315 permits the traffic, then SDN Enforcement 335a may also be configured to permit the traffic.

In some embodiments, traffic between two application pods hosted on two different VM instances is not allowed, but traffic between the two different VM instances is allowed. For example, traffic between one of the application pods 312 hosted on VM Instance 311 and another application hosted on another VM instance (not shown) is not allowed, but the traffic between the two different VM instances is allowed. Host Enforcement 315 may be configured to prevent and drop the traffic between the two application pods even though traffic between the two different VM instances is allowed.

Host Enforcement 315 is also configured to permit/deny traffic between the set of application pods 312. Host Enforcement 315 may be configured to permit/deny traffic between the set of application pods 312 based on the one or more fine grained network security policies provided by Policy Reconciliation Engine 361.

In some embodiments, a VM instance may be assigned a label. For example, VM Instance 321 may be assigned a label. Host Enforcement 315 may allow/deny traffic between one of the application pods 312 and VM instance 321 based on the label. In the event one of the application pods 312 and VM Instance 321 have the same label, Host Enforcement 315 may allow the traffic between the application pod and VM Instance 321. In the event one of the application pods 312 and VM Instance 321 have different labels, Host Enforcement 315 may deny and drop the traffic between the application pod and VM Instance 321. SDN Enforcement 335a may allow or deny the traffic depending upon whether VM Instance 311 and VM Instance 321 are part of the same security group. In the event VM Instance 311 and VM Instance 321 are part of the same security group, SDN Enforcement 335a may be configured to permit the traffic. In the event VM Instance 311 and VM Instance 321 are not part of the same security group, SDN Enforcement 335a may be configured to deny the traffic. In some embodiments, SDN Enforcement 335a may be configured to allow the traffic even though VM Instance 311 and VM Instance 321 are not part of the same security group because SDN Enforcement 335a is configured to pass through traffic that is permitted by Host Enforcement 315 (e.g., traffic between one of the application pods 312 and application 322 is permitted).

VM Instance 321 may be comprised of Non-Containerized Application 322, Host Kernel 323, Host Agent 324, and Host Enforcement 325. VM Instance 321 may be configured to receive one or more fine grained network security policies from Policy Reconciliation Engine 361. Host Agent 324 may be deployed to VM Instance 321 to provide an additional level of security (e.g., another trust zone) and flexibility. Host Agent 324 may be configured to program a data plane of Host Kernel 323 to include Host Enforcement 325. Host Enforcement 325 is based on the one or more fine grained network security policies received from Policy Reconciliation Engine 361. Normally, the SDN Enforcement of 331 will decide whether VM Instance 321 is permitted to communicate with another VM Instance or endpoint. The one or more fine grained network security policies may provide an additional level of security and flexibility by assigning VM Instance 321 one or more labels.

The cloud provider may limit the number of rules associated with a security group. The cloud provider may limit the number of IP addresses to which the rules associated with a security group apply. The fine grained network security provides an additional layer of control by enabling VM instances to be assigned a label. Assigning a label to a plurality of VM instances may provide the same type of security as a security group with added flexibility. For example, VM Instance 311 and VM instance 321 may both be assigned a "red" label. Host Enforcements 315, 325 may both be programmed to allow traffic between VM instances/application pods with a "red" label. Host Enforcement 315 may be programmed to allow traffic from VM Instance 311 to VM Instance 321 and Host Enforcement 325 may be programmed to allow traffic between VM Instance 321 and VM Instance 311. VM Instances 311, 321 may be permitted to communicate with each other without having to modify a security group to ensure that both VM Instances 311, 321 are part of the same security group.

A rule of a fine grained policy may indicate that VM Instance 321 is permitted to communicate with a first pod of the application pods 312 and not permitted to communicate with a second pod of the application pods 312 (e.g., VM Instance 321 and the first pod have the same label, VM Instance 321 and the second pod have different labels). Host Enforcement 325 may be programmed to allow traffic between VM Instance 321 and the first pod and to prevent traffic between VM Instance and the second pod. Host Enforcement 325 is coupled to SDN Enforcement 335b. In some embodiments, in the event Host Enforcement 325 does not permit the traffic, then the traffic will be dropped and SDN Enforcement 335b will not receive the traffic. In some embodiments, in the event VM Instance 321 and one of the application pods 312 are part of the security group, but VM Instance 311 is not part of the security group, Host Enforcement 325 is configured to permit traffic between VM Instance 321 and the one of the application pods 312 that is part of the security group. Normally SDN Enforcement 335b is configured to deny traffic between VM Instance 321 and VM Instance 311 because VM Instance 321 and VM Instance 311 are not part of the same security group, however, SDN Enforcement 335b may be configured to permit the traffic between VM Instance 321 and VM Instance 311 because Host Enforcement 325 allowed the traffic.

Figure 4:
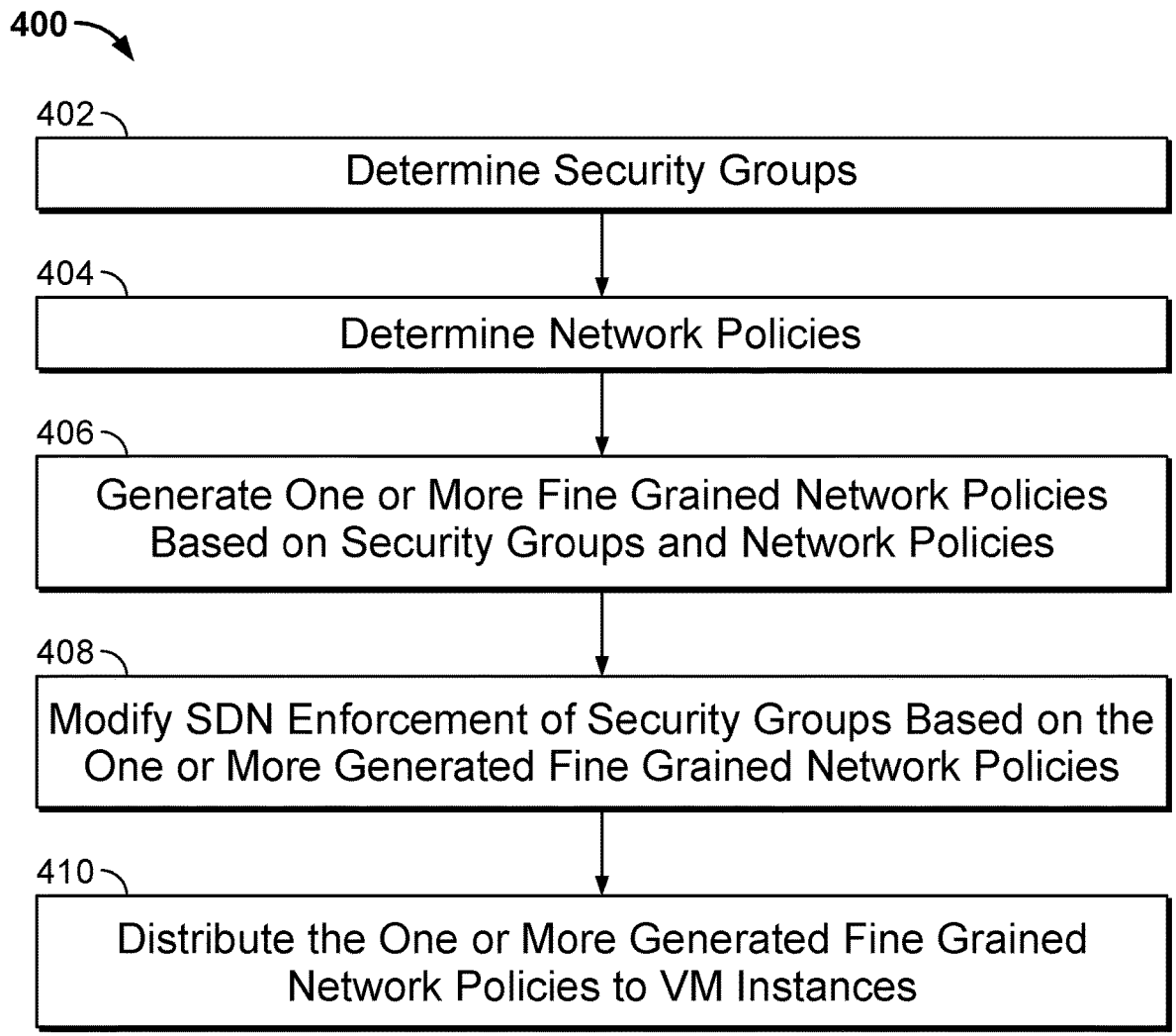
FIG. 4 is a flow chart illustrating an embodiment of a process of distributing fine grained network security policies.

FIG. 4 is a flow chart illustrating an embodiment of a process of distributing fine grained network security policies. In the example shown, process 400 may be performed by a policy reconciliation engine, such as policy reconciliation engine 361.

At 402, one or more security groups associated with a cloud provider are determined. The one or more security groups may be determined by monitoring a cloud computing service management API. The cloud provider may provide a public/private cloud. The cloud provider may provision a virtual cluster of computers to an entity (e.g., enterprise, government, individual, organization, etc.). The virtual cluster is comprised of one or more virtual machine instances. The one or more virtual machine instances enable the entity to host one or more applications/services in the public/private cloud of the cloud provider. The cloud provider may provide network security for the one or more virtual machine instances within the cloud provider's software defined network (SDN) through the use of security groups. The cloud provider may allow security groups to be defined. The security groups may be comprised of a plurality of virtual machine instances and specify which virtual machine instances are permitted to communicate to each other. A virtual machine instance may be part of one or more security groups.

A policy reconciliation engine may subscribe to an output of the cloud computing service management API. An output of the cloud computing service management API may include a list of one or more security groups and a list of one or more VM instances/cloud-based entities included in each of the one or more security groups. In some embodiments, the policy reconciliation engine may request for the list of one or more security groups and the list of one or more VM instances included in each of the one or more security groups.

The cloud computing service management API may also provide one or more rules associated with a security group. The rules in the security group dictate the connectivity allowed. For example, a rule may indicate the VM instances of the security group that are permitted to communicate with each other. The rules may include references to one or more security groups. For example, a rule of a first security group may indicate that members of the first security group may communicate with members of a second security group.

A policy reconciliation engine may be configured to subscribe to security group updates from a cloud computing service management API. For example, a VM instance may be removed from/added to a security group. The policy reconciliation engine may be configured to subscribe to such an update and modify one or more fine grain network security policies based on the update. In the event a VM instance is removed from a security group, policy reconciliation engine is configured to modify one or more fine grain network security policies such that the removed VM instance no longer has the permissions associated with the one or more fine grain network security policies. In the event a VM instance is added to a security group, policy reconciliation engine is configured to modify one or more fine grain network security policies such that the added VM instance has the permissions associated with the one or more fine grain network security policies.

At 404, one or more network policies associated with a plurality of application pods are determined. An API server of a cloud-container system may be monitored to determine the one or more network policies associated with a plurality of application pods. An application pod is a deployable unit of computing. A service/application is comprised of a plurality of application pods. The plurality of application pods of a service/application may be deployed to one or more VM instances. A network policy may apply to one or more application pods. A policy reconciliation engine may be configured to determine the one or more application pods to which a network policy applies. A network policy may apply to an application pod based on the metadata associated with the application pod. The metadata associated with an application pod may include a cluster identity, a namespace identity, an application pod identity, and/or one or more application pod labels. The metadata may include workload metadata and/or network policy metadata.

A network policy may include one or more rules. A policy reconciliation engine may be configured to determine which one or more application pods with which a rule applies. For example, a network policy may permit application pods with a particular cluster identity to communicate with each other and prevent application pods that do not have the particular cluster identity from communicating with application pods that have the particular cluster identity. A network policy may permit application pods with a particular cluster identity to communicate with each other and specify exceptions (e.g., specific IP addresses, pods associated with other namespace, specific endpoints, pods having a particular label, etc.) that are permitted are permitted to communicate with application pods having the particular cluster identity. A network policy may permit application pods with a particular name space to communicate with each other and prevent application pods that do not have the particular name space from communicating with application pods that have the particular name space. A network policy may permit application pods with a particular namespace to communicate with each other and specify exceptions (e.g., specific IP addresses, pods associated with other namespace, specific endpoints, pods having a particular label, etc.) that are permitted are permitted to communicate with application pods having the particular namespace. A network policy may permit application pods with a particular label to communicate with each other and prevent a pod that does not have the particular label from communicating with application pods having the particular label. A network policy may permit application pods with a particular label to communicate with each other and specify application pods having a different label that are permitted to communicate with application pods having the particular label. The one or more network policies may be stored by an API server of a container-orchestrator system.

At 406, one or more fine grained network security policies are generated based on the determined security groups and the determined network policies. A fine grained network policy may combine the one or more security groups with the one or more network policies.

A fine grained network policy may associate an application pod with a security group. For example, an application pod may be a member of one or more security groups. A fine grained network policy may associated a label with a VM instance. For example, a VM instance may be assigned a label. A fine grained network policy may enable a network policy to reference one or more security groups using native label based idioms of a Container-Orchestrator System. A fine grained network policy may enable a network policy to reference one or more VM instances using native label based idioms of Container-Orchestrator System. A fine grained network policy may enable a security group to reference one or more application pods using cloud provider native security group ID/name based idioms. A fine grained network policy may enforce network access control based on the union of security groups and network policy rules. In some embodiments, the fine grained network policy may enforce network access control based on the union of security groups and network policy rules as an OR decision, e.g., either security group or network policy allows the traffic. In some embodiments, the fine grained network policy may enforce network access control based on the union of security groups and network policy rules as an AND decision, e.g., both security group and network policy rules allow the traffic).

At 408, SDN enforcement of the one or more security groups is modified based on the one or more generated fine grained network security policies. For example, a first pod may be located on a first VM instance that is part of a security group. The first pod may have a label that permits the first pod to communicate with a second pod located on a second VM instance. The second VM instance may not be part of the security group. The SDN enforcement may be modified such that the first pod located on the first VM instance is permitted to communicate with the second VM instance, even though the second VM instance is not part of the security group of which the first VM instance is a member. For example, in some embodiments, a security group is created for the first VM instance and the second VM instance. In other embodiments, the second VM instance is added to a security group of which the first VM instance is associated.

At 410, the one or more fine grained network security policies are distributed to host agents of VM instances. In response to receiving the one or more fine grained network security policies, a host agent is configured to program a data plane of a host Kernel of the VM instance on which the host agent is deployed, to include host enforcement. Host Enforcement is based on the one or more fine grained network security policies received from a policy reconciliation engine and is configured to enforce network security at the pod level.

Figure 5:
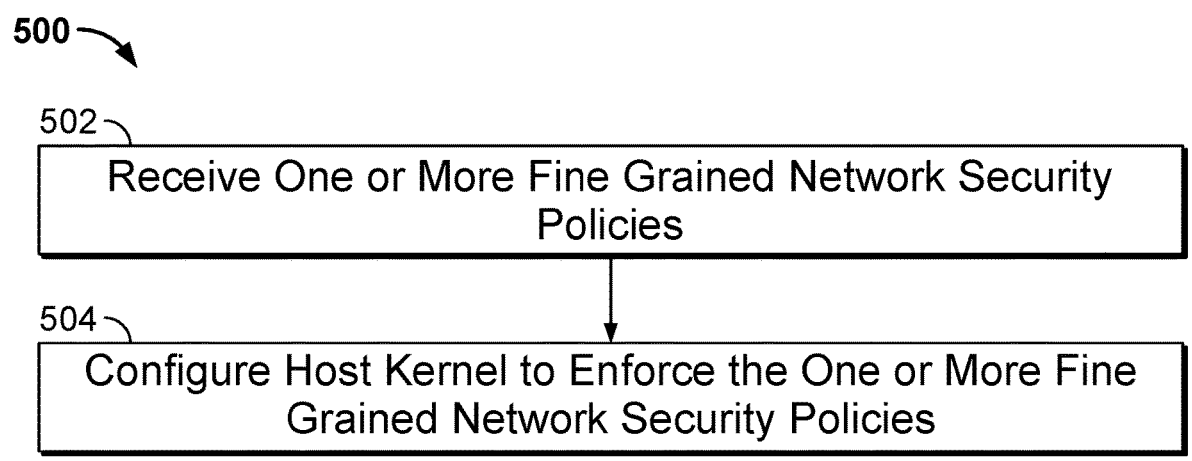
FIG. 5 is a flow chart illustrating an embodiment of a process for configuring a VM instance to enforce a fine grained network policy.

FIG. 5 is a flow chart illustrating an embodiment of a process for configuring a VM instance to enforce a fine grained network policy. In the example shown, process 500 may be performed by a host agent, such as host agent 314 or host agent 324.

At 502, one or more fine grained network security policies are received. A fine grained network policy is based on one or more security groups associated with one or more VM instances and one or more network policies associated with one or more application pods. A fine grained network security policy may enable a VM instance to have a label. This enables a network policy to apply to the VM instance. An application pod may be part of a security group.

At 504, a host kernel is configured to enforce the one or more fine grained network security policies. A host agent is configured to program a data plane of a host Kernel of the VM instance on which the host agent is deployed, to include host enforcement. Host Enforcement is based on the one or more fine grained network security policies received from a policy reconciliation engine and is configured to enforce network security at the pod level.

Figure 6:
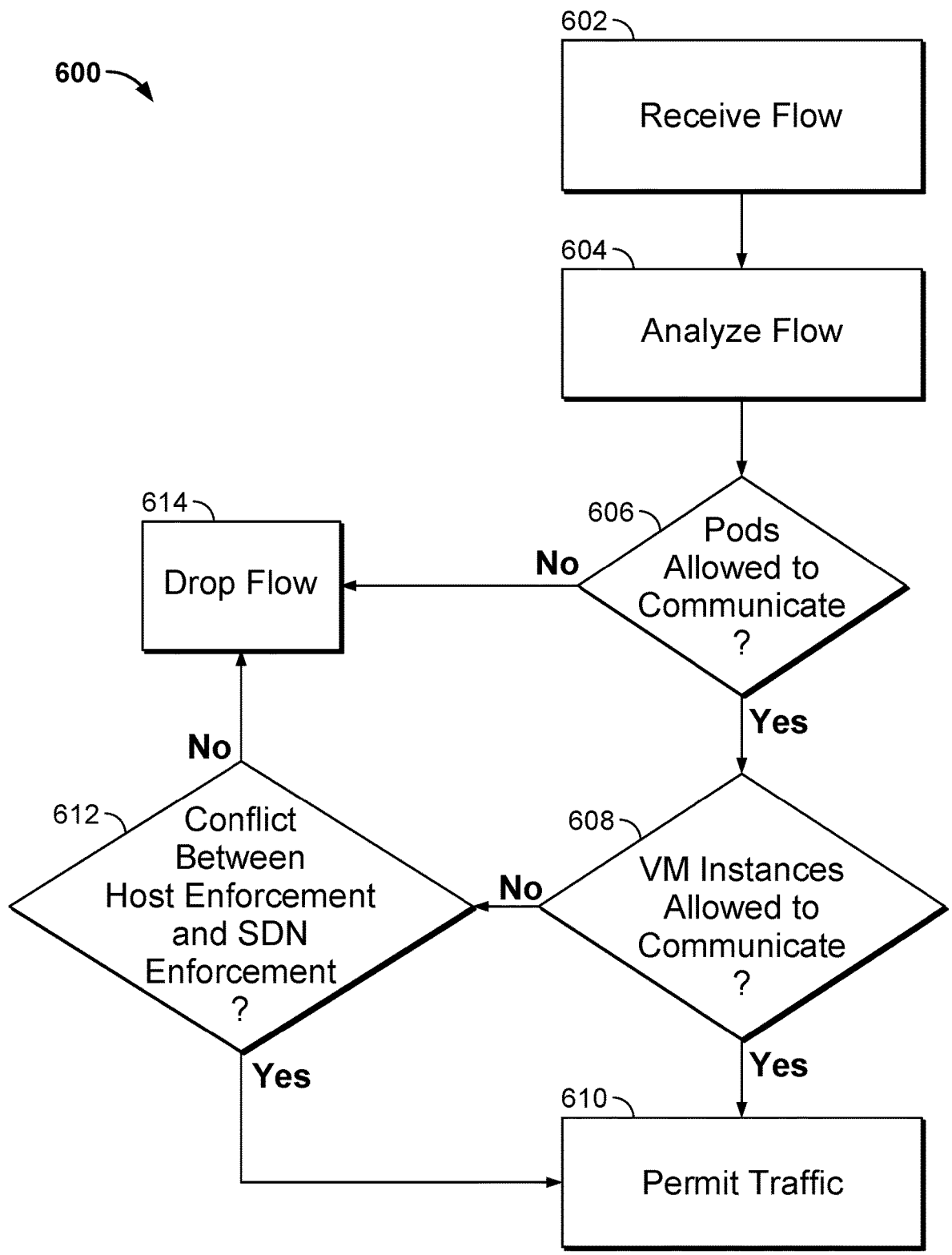
FIG. 6 is a flow chart illustrating an embodiment of a process for enforcing a fine grained network policy.

FIG. 6 is a flow chart illustrating an embodiment of a process for enforcing a fine grained network policy. In the example shown, process 500 may be performed in part by a host enforcement, such as host enforcement 315, 325 and in part by SDN enforcement, such as SDN enforcement 335*a*, 335*b*.

At 602 a flow is received. The flow may be received from an application pod in transit to an endpoint. The endpoint may be another application pod hosted on the VM instance of the application pod, another application pod hosted on a different VM instance, another VM instance, a computing device (e.g., on-prem, bare metal, etc.), etc.

At 604, the flow is analyzed. The flow data may include a source IP address (e.g., the application pod sending the flow), source port, destination IP address, destination port, and protocol used. The flow may include other information, such as for each source and destination: a cluster identity, a namespace identity, a workload pod identity, one or more application pod labels, and/or network metrics associated with the flow event (e.g., number of bytes and packets)

At 606, it is determined whether the pods are permitted to communicate. A pod may be permitted to communicate with an intended destination based on one or more fine grained network security policy rules. A rule may indicate that the pod and the destination have the same label. A rule may indicate that the pod and destination are permitted to communicate with each other even though they have different labels. A rule may indicate that the pod and the destination are part of the same security group. A rule may indicate that the pod and destination are not part of the same security group, but are permitted to communicate with each other.

In the event the pods are permitted to communicate, process 600 proceeds to 608. The traffic is forwarded from the Host Enforcement of a VM instance to the SDN enforcement of a network. In the event the pods are not permitted to communicate, process 600 proceeds to 614.

At 608, it is determined whether the VM instances on which the pods are hosted are permitted to communicate. The SDN enforcement of a network is configured to permit/deny traffic based on security group rules. A security group may be comprised of one or more members. A member may include a VM instance. A member may include a VM instance of a pod that is part of the security group. A rule may indicate that the one or members of the security group are permitted to communicate with each other. A rule may indicate that the one or members of the security group are permitted to communicate with members of another security group. A rule may indicate that the one or more members of the security group are permitted to communicate with a specific endpoint (e.g., a specific VM instance, an on-prem device, a bare metal device, etc.).

In the event the VM instances on which the pods are hosted are permitted to communicate, process 600 proceeds to 610. In the event the VM instances on which the pods are hosted are not permitted to communicate, process 600 proceeds to 612.

At 610, the traffic is permitted.

At 612, it is determined whether a conflict exists between the host enforcement and the SDN enforcement. A conflict may exist in the event the host enforcement is configured to permit the traffic and the SDN enforcement is not configured to permit the traffic. For example, a first application pod hosted on a first VM instance may be permitted to communicate with a second application pod hosted on a second VM instance because they have the same label, but the first VM instance and the second VM instance are not part of the same security group. In some embodiments, a first VM instance and the second VM instance are part of the same security group, but a first application pod hosted on the first VM instance and the second application pod hosted on the second VM instance because they have different labels. In these instances, the more specific permission control (e.g., pod level is more specific than VM instance level) controls.

In the event a conflict does not exist between the host enforcement and the SDN enforcement, process 600 proceeds to 614. In the event a conflict exists between the host enforcement and the SDN enforcement, process 600 proceeds to 610.

At 614, the flow is dropped.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a processor, configured to:
      determine one or more security groups associated with a cloud provider, wherein the one or more security groups associated with the cloud provider indicate one or more virtual machine (VM) instances of a cloud network that are permitted to communicate with each other;
      determine one or more network polices associated with a container-orchestrator system, wherein the one or more network policies associated with the container-orchestrator system indicate one or more application pods hosted on the one or more VM instances of the cloud network that are permitted to communicate with each other, wherein a network policy of the one or more network policies applies to an application pod of the one or more application pods based on metadata associated with the application pod; and
      generate one or more network security policies based on the one or more determined security groups associated with the cloud provider and the one or more determined network policies associated with the container-orchestrator system; and
   a communication interface coupled to the processor and configured to distribute the one or more network security policies to the one or more VM instances of the cloud network, wherein the one or more VM instances are configured to enforce network security based on the one or more network security policies.

2. The system of claim 1, wherein a VM instance of the one or more VM instances is associated with at least one of the one or more security groups.

3. The system of claim 1, wherein a VM instance of the one or more VM instances is configured to host at least one of the one or more application pods.

4. The system of claim 3, wherein the application pod of the one or more application pods has associated metadata.

5. The system of claim 1, wherein the metadata associated with the application pod includes at least one of a cluster identity, a namespace identity, a pod identity, and/or one or more labels.

6. The system of claim 1, wherein an agent of a VM instance of the one or more VM instances is configured to receive the one or more network security policies.

7. The system of claim 6, wherein the agent of the VM instance is configured to program a host kernel of the VM instance to perform host enforcement based on the one or more network security policies.

8. The system of claim 7, wherein the host enforcement of the VM instance is configured to:
   receive a flow received from the application pod hosted on the VM instance;
   analyze the flow; and
   permit the flow based on the one or more network security policies.

9. The system of claim 8, wherein a software defined network (SDN) enforcement associated with the cloud network is configured to receive the flow from the host enforcement.

10. The system of claim 9, wherein the SDN enforcement associated with the cloud network is configured to permit the flow in response to the host enforcem ent of the VM instance permitting the flow.

11. The system of claim 9, wherein the SDN enforcement associated with the cloud network is configured to permit the flow in response to the host enforcement of the VM instance permitting the flow even though a rule associated with the SDN enforcement indicates that the flow is to be dropped.

12. The system of claim 8, wherein the host enforcement is configured to drop traffic in the event a rule associated with the one or more network security policies indicates that traffic from the application pod to an endpoint destination is not permitted.

13. The system of claim 1, wherein the processor is further configured to modify a software defined network (SDN) enforcement associated with the cloud network based on the one or more network security policies.

14. A method, comprising:
- determining one or more security groups associated with a cloud provider, wherein the one or more security groups associated with the cloud provider indicate one or more virtual machine (VM) instances of a cloud network that are permitted to communicate with each other;
- determining one or more network polices associated with a container-orchestrator system, wherein the one or more network policies associated with the container-orchestrator system indicate one or more application pods hosted on the one or more VM instances of the cloud network that are permitted to communicate with each other, wherein a network policy of the one or more network policies applies to an application pod of the one or more application pods based on metadata associated with the application pod;
- generating one or more network security policies based on the one or more determined security groups associated with the cloud provider and the one or more determined network policies associated with the container-orchestrator system; and
- distributing the one or more network security policies to the one or more VM instances of the cloud network, wherein the one or more VM instances are configured to enforce network security based on the one or more network security policies.

15. The method of claim 14, wherein an agent of a VM instance of the one or more VM instances is receive the one or more network security policies.

16. The method of claim 15, wherein the agent of the VM instance is configured to program a host kernel of the VM instance to perform host enforcement based on the one or more network security policies.

17. The method of claim 14, further comprising modifying a software defined network (SDN) enforcement associated with the cloud network based on the one or more network security policies.

18. A computer program product, the computer program product being embodied in a non-transitory computer readable storage medium and comprising computer instructions for:
- determining one or more security groups associated with a cloud provider, wherein the one or more security groups associated with the cloud provider indicate one or more virtual machine (VM) instances of a cloud network that are permitted to communicate with each other;
- determining one or more network polices associated with a container-orchestrator system, wherein the one or more network policies associated with the container-orchestrator system indicate one or more application pods hosted on the one or more VM instances of the cloud network that are permitted to communicate with each other, wherein a network policy of the one or more network policies applies to an application pod of the one or more application pods based on metadata associated with the application pod;
- generating one or more network security policies based on the one or more determined security groups associated with the cloud provider and the one or more determined network policies associated with the container-orchestrator system; and
- distributing the one or more network security policies to the one or more VM instances of the cloud network, wherein the one or more VM instances are configured to enforce network security based on the one or more network security policies.

19. The computer program product recited in claim 18, further comprising computer instructions for:
- modifying a software defined network (SDN) enforcement associated with the cloud network based on the one or more network security policies.

* * * * *